(12) United States Patent
Muldowney

(10) Patent No.: US 10,023,090 B2
(45) Date of Patent: Jul. 17, 2018

(54) VEHICLE SEAT WITH STOWABLE HEADREST

(71) Applicant: FORD GLOBAL TECHNOLOGIES, LLC, Dearborn, MI (US)

(72) Inventor: Phillip Kerry Muldowney, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 50 days.

(21) Appl. No.: 15/258,545

(22) Filed: Sep. 7, 2016

(65) Prior Publication Data

US 2018/0065522 A1    Mar. 8, 2018

(51) Int. Cl.
*A47C 7/36*    (2006.01)
*B60N 2/874*    (2018.01)

(52) U.S. Cl.
CPC .................. *B60N 2/874* (2018.02)

(58) Field of Classification Search
CPC ........ A47C 7/38; B60N 2/487; B60N 2/4855; B60N 2/874
USPC .......................................... 297/408
See application file for complete search history.

(56) References Cited

U.S. PATENT DOCUMENTS

| | | | | |
|---|---|---|---|---|
| 1,714,696 A * | 5/1929 | Samualian | ............... | A47C 1/10 297/112 |
| 3,008,767 A * | 11/1961 | Fox | .......................... | A47C 7/38 297/403 |
| 3,275,374 A * | 9/1966 | Holzner | ................. | A47C 1/036 297/403 |
| 3,462,193 A * | 8/1969 | Tamura | .................... | A47C 7/38 297/396 |
| 4,711,494 A * | 12/1987 | Duvenkamp | .......... | B60N 2/487 297/403 |
| 5,171,062 A * | 12/1992 | Courtois | .............. | B60N 2/0284 297/284.11 |
| 7,458,640 B1 * | 12/2008 | Hill | ...................... | B60N 2/0244 297/408 |
| 2002/0043860 A1 * | 4/2002 | Dinkel | ................. | B60N 2/4808 297/410 |
| 2002/0084686 A1 * | 7/2002 | Takata | ................. | B60N 2/4855 297/408 |

(Continued)

FOREIGN PATENT DOCUMENTS

DE    3101726 A1    8/1982
DE    102004025569 A1    12/2005

(Continued)

OTHER PUBLICATIONS

English Machine Translation of DE102004025569A1.

(Continued)

*Primary Examiner* — Robert Canfield
(74) *Attorney, Agent, or Firm* — Vichit Chea; King & Schickli, PLLC

(57) ABSTRACT

An apparatus is for providing seating in a vehicle passenger compartment. A vehicle seat includes a headrest for forming at least a portion of a seating surface of the vehicle seat in a stowed position and a panel for forming the portion of the seating surface in a deployed position of the headrest. The stowed headrest may be positioned in a cavity formed in the seat. The panel may be connected to the headrest, and at least partially sandwiched between an inner surface of the cavity and the headrest in the stowed position.

19 Claims, 3 Drawing Sheets

(56) References Cited

U.S. PATENT DOCUMENTS

| | | | | |
|---|---|---|---|---|
| 2006/0175874 A1* | 8/2006 | Welch | ............... | B60N 2/3011 297/15 |
| 2007/0001500 A1* | 1/2007 | Kraft | ............... | B60N 2/4858 297/408 |
| 2008/0093910 A1* | 4/2008 | Kato | ............... | B60N 2/3013 297/463.2 |
| 2008/0277990 A1* | 11/2008 | Yasukawa | ............ | B60N 2/4855 297/409 |
| 2009/0167064 A1* | 7/2009 | Yoshizawa | ........... | B60N 2/4832 297/112 |
| 2010/0244526 A1* | 9/2010 | Kajimoto | ............ | B60N 2/4808 297/354.1 |
| 2012/0212025 A1* | 8/2012 | Schroeder | .............. | B60N 2/487 297/391 |
| 2012/0326481 A1* | 12/2012 | Yetukuri | .............. | B60N 2/4855 297/403 |
| 2014/0203614 A1* | 7/2014 | Line | .................... | B60N 2/4838 297/391 |

FOREIGN PATENT DOCUMENTS

| | | | | |
|---|---|---|---|---|
| DE | 102009048260 A1 | 7/2010 | | |
| EP | 0895895 B1 | 5/2001 | | |
| FR | 2870796 A1 | 12/2005 | | |
| JP | 04221513 A | * 8/1992 | ............... | A47C 7/38 |
| JP | 2012126203 A | 7/2012 | | |
| KR | 0142337 B1 | 7/1998 | | |

OTHER PUBLICATIONS

English Machine Translation of DE102009048260A1.
English Machine Translation of DE3101726A1.
English Machine Translation of EP0895895B1.
English Machine Translation of FR2870796A1.
English Machine Translation of JP2012126203A.
English Machine Translation of KR0142337B1.

* cited by examiner

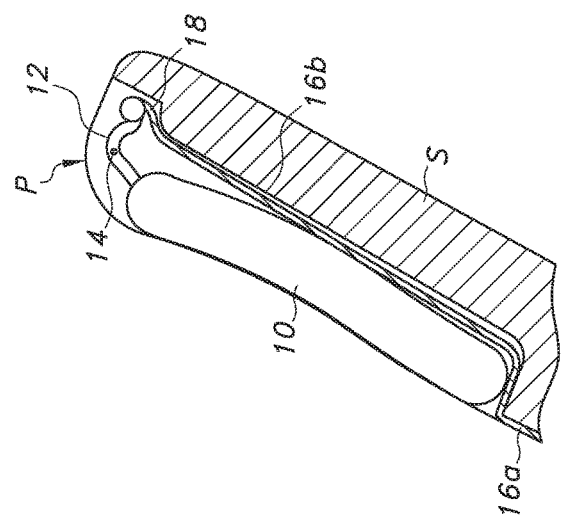
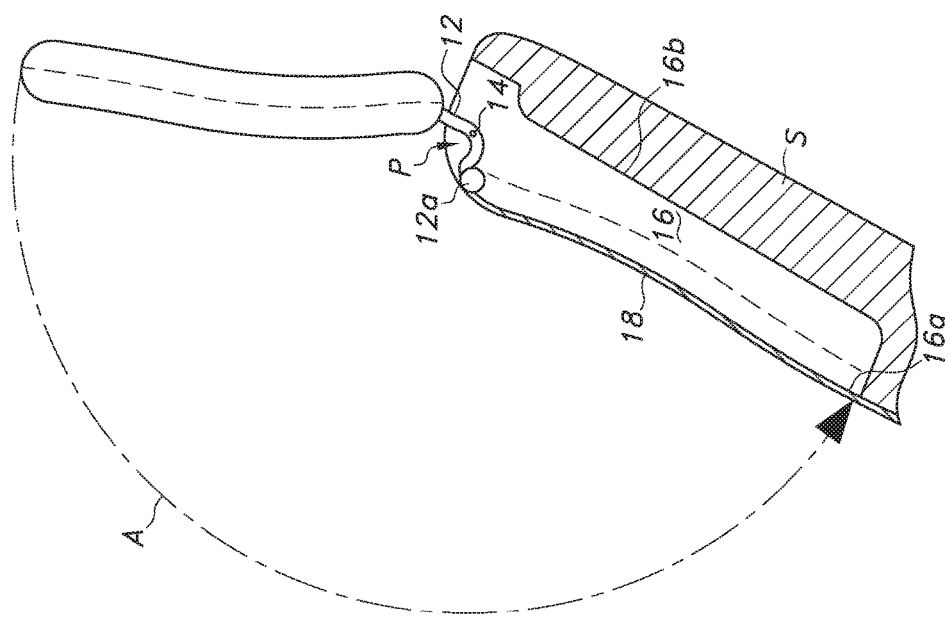

VEHICLE SEAT WITH STOWABLE HEADREST

TECHNICAL FIELD

This document relates generally to the motor vehicle field and, more particularly, to a vehicle seat with a stowable headrest.

BACKGROUND

Motor vehicles, such as SUVs or minivans, typically include seats with headrests. Some arrangements permit removal of the headrest from the corresponding seat, but lack a convenient place to store it. Proposals have been made a headrest that can be pivoted from a cavity in the seat to an operative position, but this leaves an undesirable and unattractive cavity in the seating surface, which could lead to discomfort. Other solutions require withdrawing or removing part of the seat surface in order to deploy or stow the headrest, which means deployment cannot be easily achieved while seated.

Accordingly, a need is identified for a vehicle seat with an improved stowable headrest.

SUMMARY

According to one aspect of the disclosure, an apparatus for providing seating in a vehicle passenger compartment is provided. The apparatus comprises a vehicle seat including a headrest for forming at least a portion of a seating surface of the vehicle seat in a stowed position. A panel is also provided for forming the portion of the seating surface in a deployed position of the headrest.

In one embodiment, the headrest is pivotally mounted to the vehicle seat and remains connected thereto in both the stowed and deployed positions. The vehicle seat may comprise a cavity for receiving the headrest in the stowed position, which cavity may at least partially receive the panel in the stowed position. In such stowed position, the panel may be flaccid or relaxed within the cavity, and then pulled taut in the fully erected, operative position of the headrest when deployed.

The panel may comprise a flexible material for covering the cavity in the deployed position of the headrest and for folding into the cavity in the stowed position of the headrest. The panel may be at least partially sandwiched between an inner surface of the cavity and the headrest in the stowed position of the headrest. The panel may also be connected to a pivotable support for the headrest such that movement of the headrest from the stowed to the deployed position deploys the panel to form the portion of the seating surface. The pivotable support may include a first end portion connected to the panel, a second end portion connected to the headrest, and an intermediate portion connected to the seat for pivoting movement.

A further aspect of the disclosure pertains to an apparatus for providing seating in a vehicle passenger compartment. The apparatus comprises a vehicle seat including a headrest having a deployed position and a stowed position in which the headrest is within a cavity of the vehicle seat. A panel covers the cavity in the deployed position of the headrest, and is at least partially sandwiched between an inner surface of the cavity and the headrest in a stowed position.

The headrest in the stowed position may form a portion of a seating surface of the vehicle seat in a stowed position and the panel forms the portion of the seating surface in the deployed position of the headrest. In one embodiment, the headrest is pivotally mounted to the vehicle seat and remains connected thereto in both the stowed and deployed positions. The panel may comprise a flexible material for covering the cavity in the deployed position of the headrest and for folding into the cavity in the stowed position of the headrest.

The panel may also be connected to a pivotable support for the headrest. Accordingly, movement of the headrest from the stowed to the deployed position deploys the panel to form the portion of the seating surface. The pivotable support may include a first end connected to the panel, a second end connected to the headrest, and an intermediate portion connected to the seat for pivoting movement. The panel may be flaccid in the stowed position of the headrest and taut in the deployed position of the headrest.

Yet another aspect of the disclosure pertains to an apparatus for providing seating in a vehicle passenger compartment. The apparatus comprises a vehicle seat including a headrest adapted for moving between a deployed position and a stowed position. A panel connected to the headrest forms a portion of a seating surface in the deployed position of the headrest. In one embodiment, the headrest is mounted to a support at a first end portion and to the panel at a second end portion, an intermediate portion of the support connected to the vehicle seat for pivoting movement.

In the following description, several embodiments of the vehicle seat with a stowable headrest are shown and described. As it should be realized, the arrangement is capable of other, different embodiments and its several details are capable of modification in various, obvious aspects all without departing from the vehicle seat with a stowable headrest as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed vehicle seat with a stowable headrest, serve to explain certain principles thereof. In the drawing figures:

FIG. 3 is a partially cross-sectional view of the headrest in the deployed position; and FIG. 4 is a partially cross-sectional view of the headrest in the stowed position.

Reference will now be made in detail to the present preferred embodiments of a vehicle seat with a stowable headrest, examples of which are illustrated in the accompanying drawing figures.

DETAILED DESCRIPTION

Figure 1:
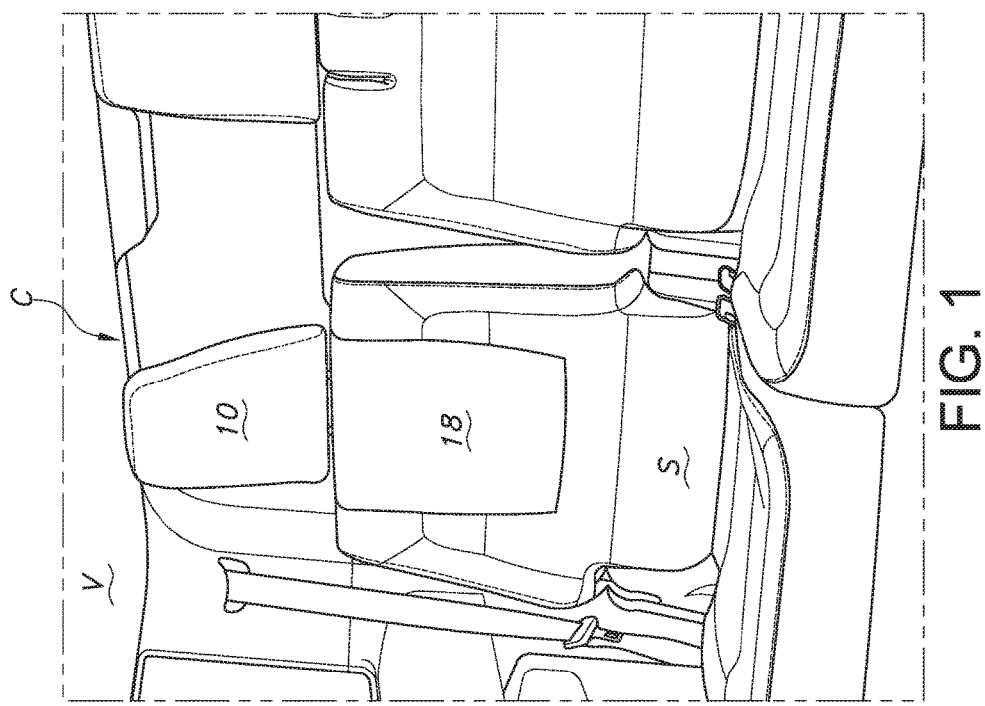
FIG. 1 is a perspective view of the headrest in a deployed position.

As shown in FIG. 1, a motor vehicle V has a passenger compartment or cabin C including a seat S having a headrest 10, which typically matches the seat in terms of the material and construction (e.g., a durable, smooth covering, such as leather, with a soft or spongy interior, typically made of foam or a like resilient material). In the deployed position, as shown, the headrest 10 typically projects vertically about the upper perimeter of the seat S. Thus, it provides a convenient and comfortable place for a passenger to rest their head while seated.

Figure 2:
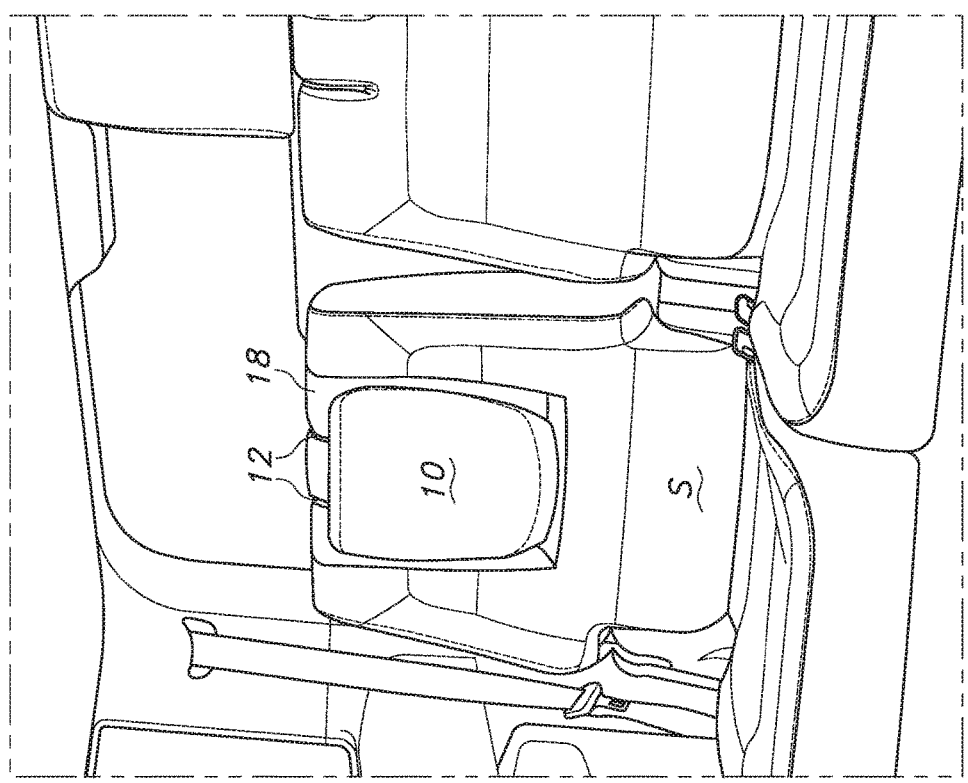
FIG. 2 is a perspective view of the headrest in a stowed position.

The headrest 10 is mounted for moving between the deployed operative position (FIGS. 1 and 3) and the stowed position (FIGS. 2 and 4), while at all times remaining connected to the seat S. This can be achieved by providing one or more supports 12 that are pivotally mounted to the seat S, such as within a recess formed along an upper portion thereof, to allow for movement of the headrest along a generally arcuate path A. The pivot point P may be established by a fixed, transverse post 14 about which each support 12 may pivot, such as by connection to an intermediate portion between the ends (one of which may be recessed within the material of the headrest 10). To lend stability and ensure longevity over the operative life of the vehicle, two such supports may be provided, and the post 14 may be connected directly to the seat S or an intermediate part (not shown). The support(s) 12 may comprise slender, metal (stainless steel) rods, and may be generally L-shaped, the reasons for which orientation will become clearer upon reviewing the following description.

The seat S is provided with a cavity 16 for receiving the headrest 10 in the stowed position, such that it forms a part or portion of the seating surface. As perhaps best shown FIG. 4, the arrangement may be such that the headrest 10 when stowed is flush with the forward face of the seat S, such as the portion for engaging a passenger's upper back or shoulders when seated. Consequently, the stowing of the headrest 10 does not impact the comfort of the seated passenger in any material way, yet provides a convenient place for storing the headrest when not needed or desired (and without the need for detaching it from the seat S).

To cover the cavity 16 when the headrest 10 is deployed and form the otherwise missing portion of the seating surface, a movable panel 18 may be provided as an integral part of the seat S. The panel 18 may be connected to the seat S at one end portion, such as along an upper edge 16a of the cavity 16. The connection may be established along the entire perimeter of the seat surface surrounding the cavity 16 or a portion thereof, except for the part forming the connection to the support 12 for supporting the headrest 10 at the other end portion. The panel 18 may comprise a material that covers the cavity 16 when the headrest 10 is deployed, but then is recessed within the cavity between the headrest and an inner surface 16b (such as the rear most portion, which is a generally vertical wall) of the cavity when stowed, and thus sandwiched therebetween.

Consequently, as can be understood with reference to FIG. 1, the panel 18, and the upper portion thereof in particular, is caused to move from a first (typically rearward) position closer to the inner surface 16b of the cavity 16 in the seat S, to a second (typically forward) position as a result of the movement of the support(s) 12 about the pivot point P, which is of course caused by the movement of the headrest 10 (which may be manual or automatic). In the erected position, the panel 18 thus covers the cavity 16 and provides a continuous seating surface that is aesthetically pleasing and also functional in the sense that it should not interfere with the comfort of the seated passenger (whose shoulders and upper back may still engage the surrounding surfaces of the seat S). Furthermore, the deployment of the panel 18 can be achieved by a passenger while seated by simply leaning forward and erecting the headrest 10.

In one particular embodiment, the material is sufficiently flexible such that it can move from a relaxed, folded or flaccid form during stowage of the headrest 10 (FIG. 4) to a taut position for covering the cavity 16 in the deployed position. As can be appreciated, the taut state is fully maintained by the weight and position of the headrest 10 (which may be associated with a locking mechanism for holding it in place when deployed) by virtue of the connection to the upper end portion of the panel 18. Alternatively, the material may be of a dimension to cover the cavity 16 in the deployed position of the headrest 10 (perhaps in a semi-relaxed or partially taut state), and then assume the recessed position within cavity without stretching simply by adjusting the geometry of the arrangement. The connected end portion 12a of the support 12 may also comprise an oversized, rounded part to allow for any excess material of the panel 18 to be wound partially around it to remove any excess slack.

The relative sizing in terms of width or thickness of the headrest 10 and the panel 18 may also be adjusted as necessary or desired. For instance, as indicated in FIG. 3, undersizing the headrest 10 (note dashed line profile) may allow for the panel 18 to be oversized a corresponding amount to occupy a greater portion of cavity 16 in the deployed position. The thickened panel 18 that results may thus be made more rigid and thus assume more pressure from a seated passenger, which may be desirable in some applications. In any case, a desirable approach is for the thickness of the headrest 10 plus the thickness of the panel 18 to be approximately equal to the depth of the cavity 16. The panel 18 may also be designed to fold and unfold in a preferential manner, such as by providing creases, fold lines, or the like.

In summary, an improved stowable headrest 10 is provided that can be stowed in position for forming a part of the seating surface, and then deployed for the desired head support and resting function while remaining connected to the seat. A cavity 16 in the seat S receives the headrest 10 when stowed, thus avoiding the need for removal and separate storage. Yet, when deployed, a panel 18 covers the cavity 16, thus providing an aesthetically pleasing and comfortable solution for the passenger seating.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
    a vehicle seat including a headrest for forming at least a portion of a seating surface of the vehicle seat in a stowed position and a panel for forming the portion of the seating surface in a deployed position of the headrest, the panel being connected to a support including a first end portion connected to the panel, a second end portion connected to the headrest, and an intermediate portion connected to the seat, such that pivoting movement of the headrest from the stowed to the deployed position deploys the panel to form the portion of the seating surface.

2. The apparatus of claim 1, wherein the headrest is pivotally mounted to the vehicle seat and remains connected thereto in both the stowed and deployed positions.

3. The apparatus of claim 1, wherein the vehicle seat comprises a cavity for receiving the headrest in the stowed position, the cavity including the panel.

4. The apparatus of claim 3, wherein the panel comprises a flexible material for covering the cavity in the deployed position of the headrest and for folding into the cavity in the stowed position of the headrest.

5. The apparatus of claim 3, wherein the panel is at least partially sandwiched between an inner surface of the cavity and the headrest in the stowed position of the headrest.

6. The apparatus of claim 1, wherein the panel is flaccid in the stowed position of the headrest.

7. A vehicle including the apparatus of claim 1.

8. The apparatus of claim 1, wherein the first end portion comprises a rounded part for allowing the panel to be wound partially around the rounded part to remove any excess slack.

9. An apparatus, comprising:
  a vehicle seat including a headrest having a deployed position and a stowed position in which the headrest is within a cavity of the vehicle seat; and
  a panel for covering the cavity in the deployed position of the headrest, the panel being at least partially sandwiched between an inner surface of the cavity and the headrest in a stowed position,
  a headrest support including a first end connected to the panel, a second end connected to the headrest, and an intermediate portion connected to the seat for pivoting movement, such that movement of the headrest from the stowed to the deployed position deploys the panel to form a portion of a seating surface.

10. The apparatus of claim 9, wherein the headrest forms at least a portion of a seating surface of the vehicle seat in a stowed position and the panel forms the portion of the seating surface in the deployed position of the headrest.

11. The apparatus of claim 9, wherein the headrest is pivotally mounted to the vehicle seat and remains connected thereto in both the stowed and deployed positions.

12. The apparatus of claim 9, wherein the panel comprises a flexible material for covering the cavity in the deployed position of the headrest and for folding into the cavity in the stowed position of the headrest.

13. The apparatus of claim 9, wherein the panel is flaccid in the stowed position of the headrest.

14. A vehicle including the apparatus of claim 9.

15. The apparatus of claim 9, wherein the first end comprises a rounded part for allowing the panel to be wound partially around the rounded part to remove any excess slack.

16. An apparatus, comprising:
  a vehicle seat including a headrest adapted for moving between a deployed position and a stowed position, a panel for forming a portion of a seating surface in the deployed position, and a headrest support connected to the vehicle seat and the panel, such that movement of the headrest from the stowed to the deployed position deploys the panel to form a portion of a seating surface of the vehicle seat.

17. A vehicle including the apparatus of claim 16.

18. The apparatus of claim 16, wherein an end portion of the support is connected to the panel.

19. The apparatus of claim 18, wherein the end portion comprises a rounded part for allowing the panel to be wound partially around the rounded part to remove any excess slack.

* * * * *